(12) United States Patent  
Kobayashi

(10) Patent No.: US 8,314,645 B2
(45) Date of Patent: Nov. 20, 2012

(54) SIGNAL PROCESSING DEVICE

(75) Inventor: Masato Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 12/957,079

(22) Filed: Nov. 30, 2010

(65) Prior Publication Data
US 2011/0128058 A1  Jun. 2, 2011

(30) Foreign Application Priority Data
Dec. 1, 2009  (JP) ................. 2009-273792

(51) Int. Cl.
*G06F 1/04* (2006.01)
(52) U.S. Cl. ....................... 327/291; 327/295
(58) Field of Classification Search .......... None
See application file for complete search history.

(56) References Cited

U.S. PATENT DOCUMENTS

| | | | |
|---|---|---|---|
| 6,240,541 B1 * | 5/2001 | Yasuda et al. | 716/112 |
| 6,583,649 B2 | 6/2003 | Nakamura | |
| 7,391,255 B2 * | 6/2008 | Matsuzaki | 327/565 |
| 8,055,930 B2 * | 11/2011 | Bae et al. | 713/400 |

FOREIGN PATENT DOCUMENTS

| | | |
|---|---|---|
| JP | 2001-203763 A | 7/2001 |
| JP | 2005-26306 A | 1/2005 |

* cited by examiner

*Primary Examiner* — Cassandra Cox
(74) *Attorney, Agent, or Firm* — Fujitsu Patent Center

(57) ABSTRACT

A signal processing device includes: a wiring unit including a plurality of signal input terminals, wirings extending from the signal input terminals, and a wiring concentration section on which the wirings are concentrated; a plurality of electronic circuit units, each including a device that outputs a signal, an output control section that controls a timing at which the device outputs the signal, and a signal output terminal coupled to the signal input terminal; and a control unit that supplies a reference timing signal to the plurality of electronic circuit units, wherein each of the output control section controls a timing at which the signal is output based on the reference timing signal and phase difference information indicative of a phase difference between the signal and the reference timing signal.

9 Claims, 9 Drawing Sheets

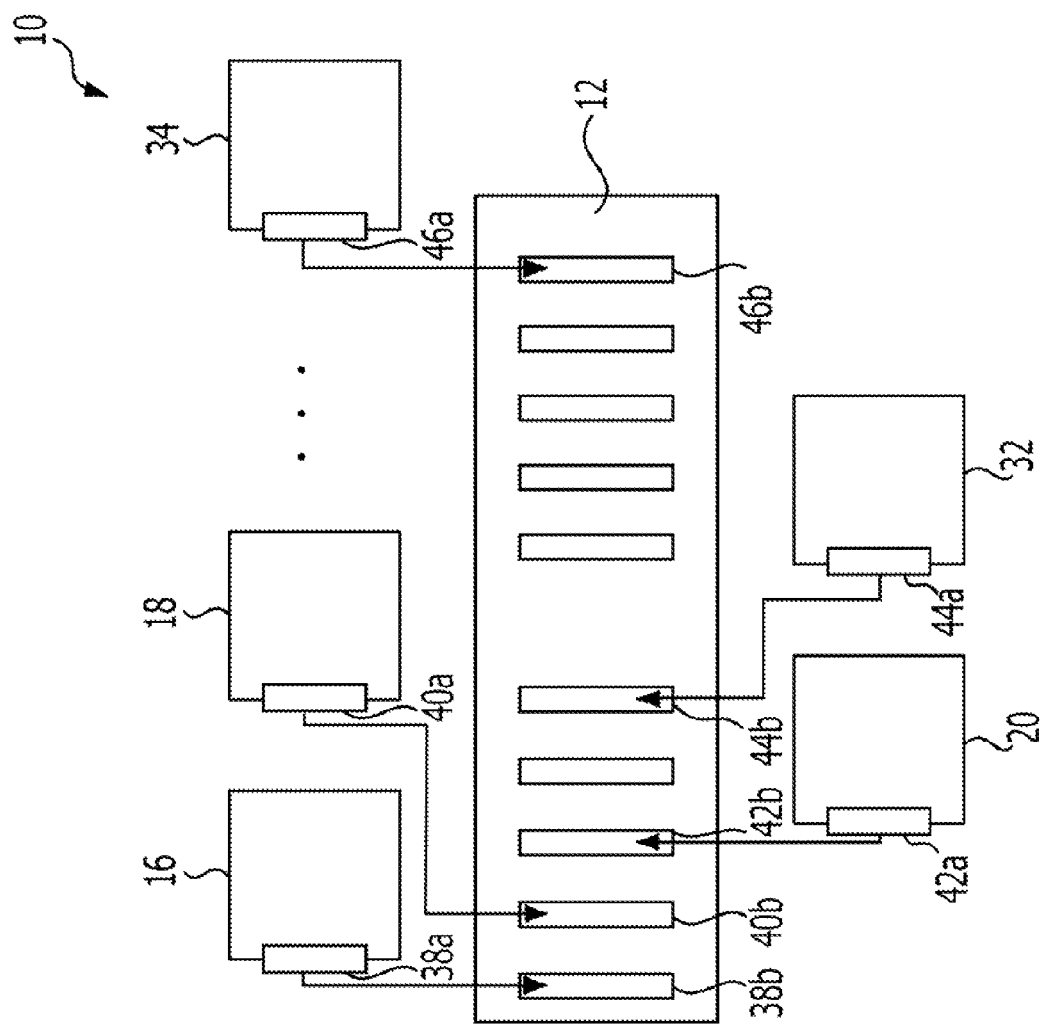

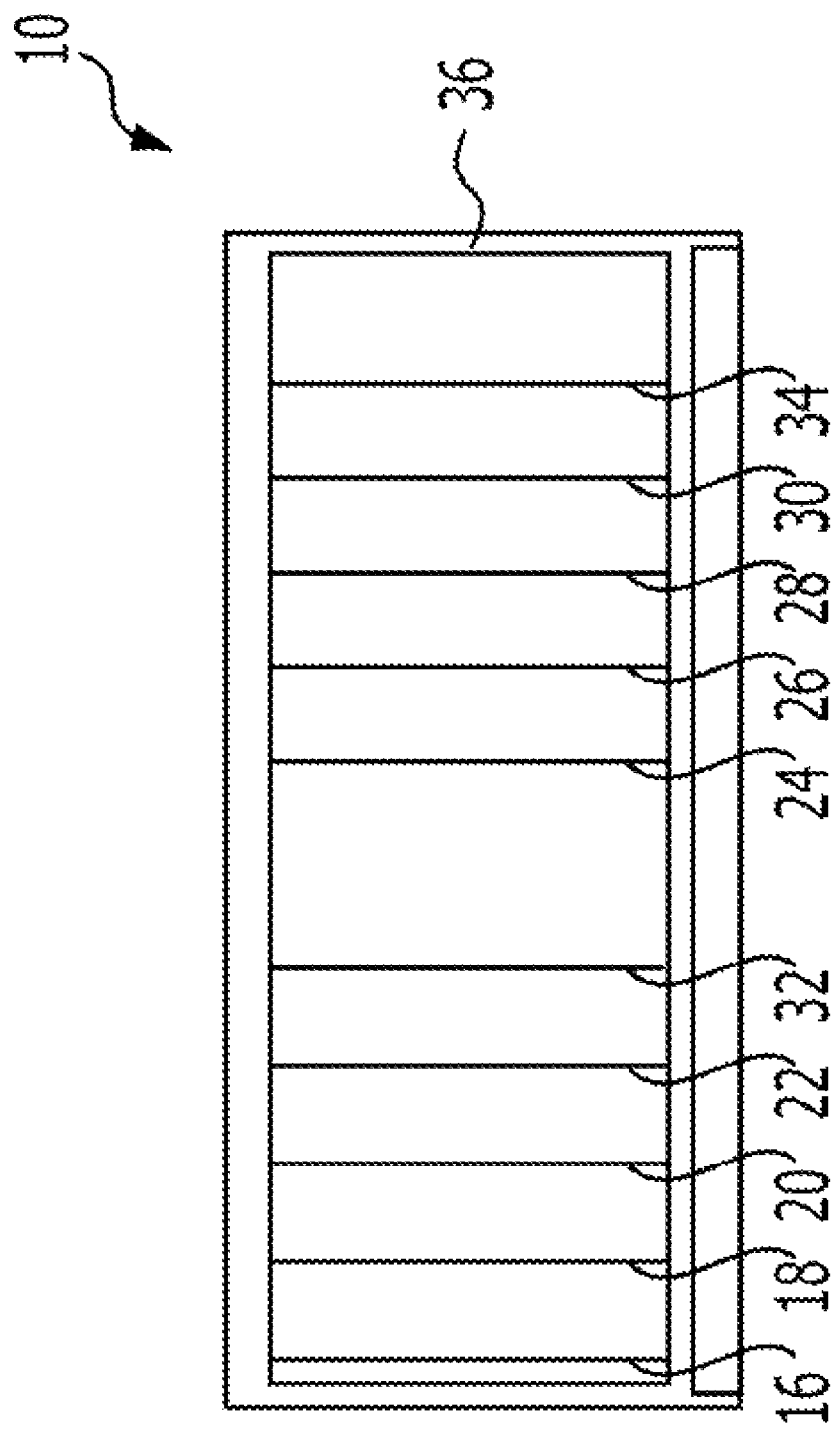

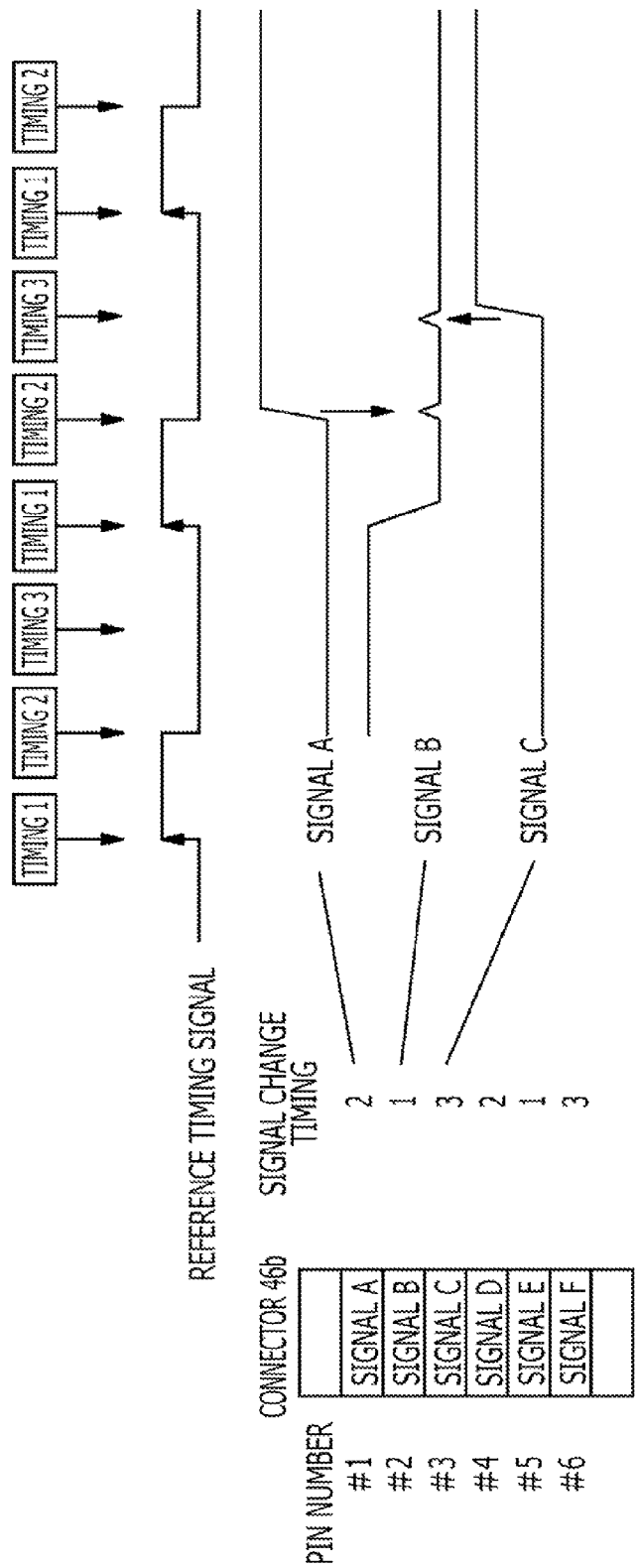

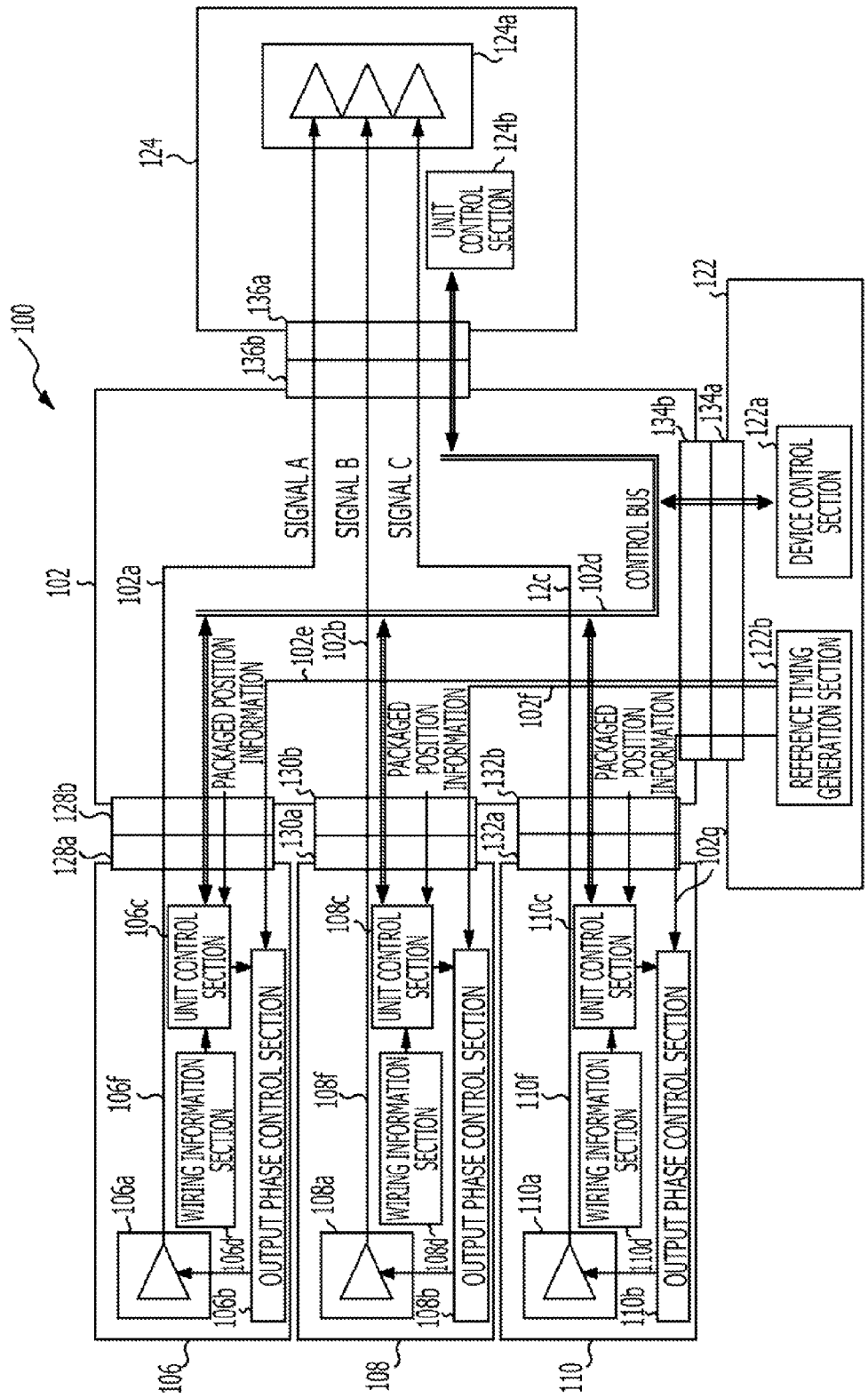

US 8,314,645 B2

SIGNAL PROCESSING DEVICE

CROSS-REFERENCE TO RELATED APPLICATIONS

This application is based upon and claims the benefit of priority from the prior Japanese Patent Application No. 2009-273792 filed on Dec. 1, 2009, the entire contents of which are incorporated herein by reference.

FIELD

The embodiments discussed herein are related to a signal processing device in which a plurality of electronic circuit units are electrically coupled to a wiring unit.

BACKGROUND

Nowadays, in a communication apparatus or an information processing apparatus such as a computer or the like, a signal processing device of the plug-in unit type in which electronic circuit units are coupled to a wiring unit (hereinafter, referred to as a back wiring board (BWB)) is used.

The BWB is electrically coupled to electronic circuit units and is configured to supply power to the electronic circuit units and to allow signals to be sent and received among the plurality of electronic circuit units.

Japanese Laid-open Patent Publication No. 2005-26306 discloses a housing structure describing assembly of a high-strength housing body using a smaller number of assembling steps and a smaller number of components in electronic equipment using a BWB of the type as mentioned above.

FIG. 6 is a related art schematic diagram illustrating an example of a signal processing device 300 which is electronic equipment using a BWB. The signal processing device 300 illustrated in FIG. 6 includes a BWB 302, electronic circuit units 306, 308, 310, a control unit 322 and a cross-connection unit 324.

The electronic circuit units 306, 308 and 310 respectively include main signal devices 306a, 308a and 310a that output signals and unit control sections 306b, 308b and 310b that control timings (output phases) at which the signals are output from the main signal devices 306a, 308a and 310a.

The cross-connection unit 324 includes a cross-connection device 324a that performs cross-connection processing using the signals sent from the electronic circuit units 306, 308 and 310 and a unit control section 324b that controls the cross-connection processing.

The control unit 322 includes a device control section 322a. The device control section 322a generates a control signal, sends the generated control signal to the electronic circuit units 306, 308, 310 and the cross-connection unit 324 via a control bus disposed in the BWB 302 to control the operations of the electronic circuit units 306, 308 and 310 and the cross-connection unit 324.

The BWB 302 includes wirings through which the BWB 302 is coupled to the electronic circuit units 306, 308 and 310 and the cross-connection unit 324. The BWB 302 is coupled to the electronic circuit units 306, 308 and 310, the control unit 322 and the cross-connection unit 324 respectively via connectors 328, 330, 332, 334 and 336.

In the signal processing device 300 illustrated in FIG. 6, a plurality of wirings which are respectively coupled to the electronic circuit units 306, 308 and 310 are concentrated on and arranged in the connector 336 that serves to couple the cross-connection unit 324 to the BWB 302 and signals A, B and C are sent to the cross-connection unit 324 via the connector 336.

SUMMARY

According to an aspect of the invention, a signal processing device includes: a wiring unit including a plurality of signal input terminals, wirings extending from the signal input terminals, and a wiring concentration section on which the wirings are concentrated; a plurality of electronic circuit units, each including a device that outputs a signal, an output control section that controls a timing at which the device outputs the signal, and a signal output terminal coupled to the signal input terminal; and a control unit that supplies a reference timing signal to the plurality of electronic circuit units, wherein each of the output control section controls a timing at which the signal is output based on the reference timing signal and phase difference information indicative of a phase difference between the signal and the reference timing signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 1A is a diagram illustrating one example of an outline of a signal processing device according to one embodiment;

FIG. 1B is a diagram illustrating another example of the outline of the signal processing device according to one embodiment;

FIG. 3A is a diagram illustrating one example of signal change timings;

FIG. 4 is a schematic diagram illustrating an example of a simplified configuration of a signal processing device according to another embodiment;

DESCRIPTION OF EMBODIMENTS

Figure 6:
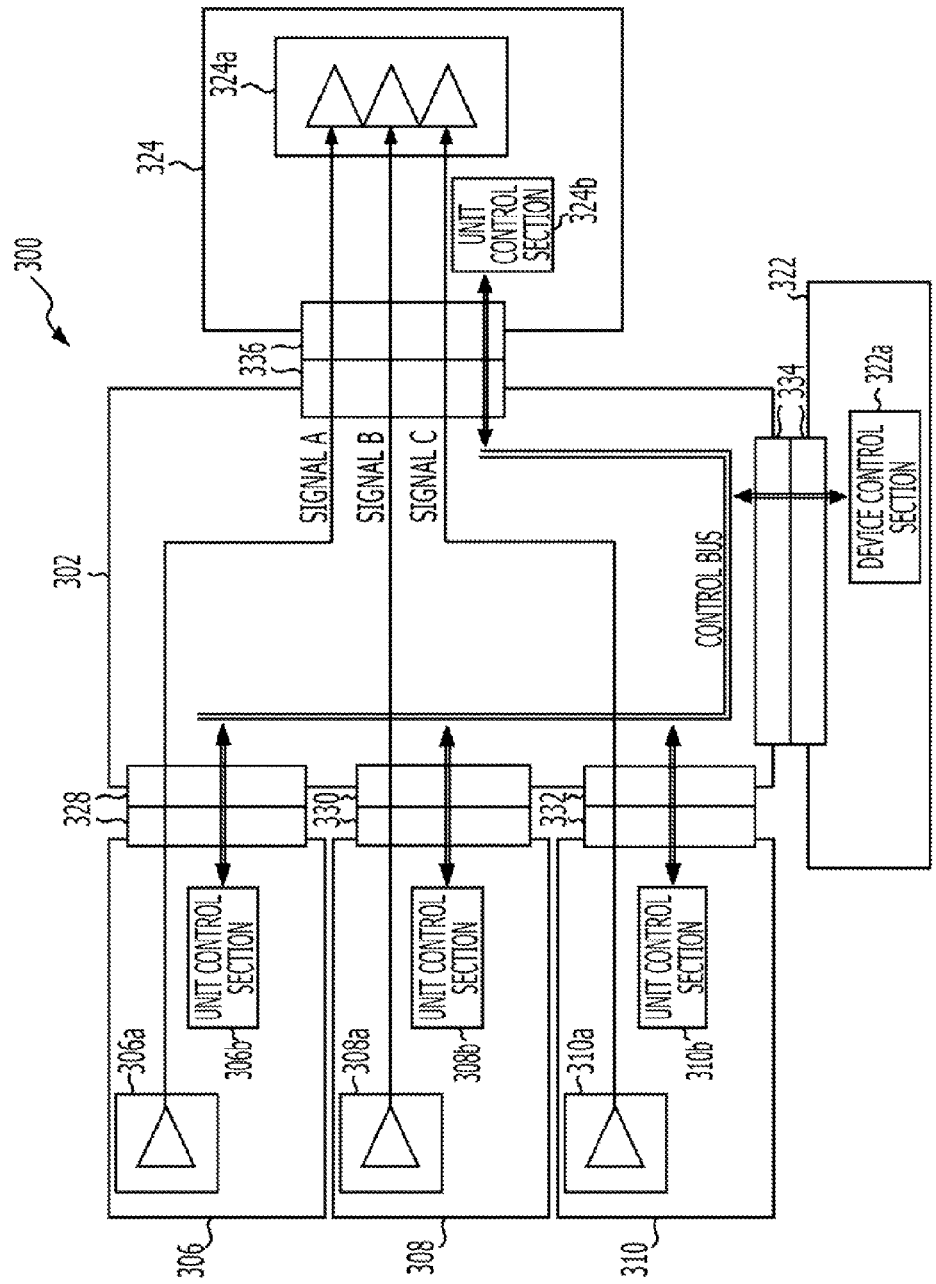
FIG. 6 is a schematic diagram illustrating an example of a simplified configuration of a related art signal processing device.

In the related art signal processing device 300 illustrated in FIG. 6, sometimes crosstalk occurs among the signals A, B and C owing to the concentration of wirings on the connector 336.

Figure 7:
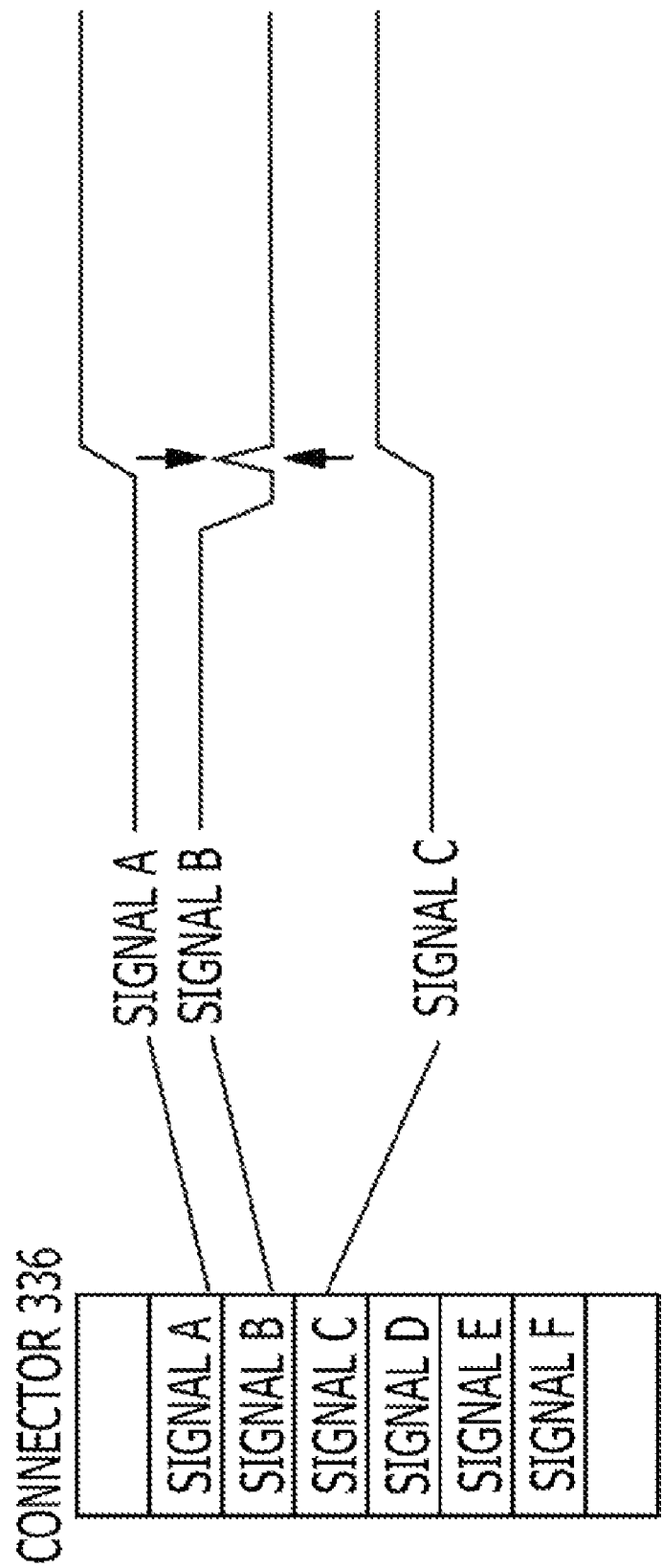
FIG. 7 is a diagram illustrating an example of cross-talk noise in a signal generated in a related art signal processing device.

FIG. 7 is a diagram illustrating an example of a connector pin arrangement in the connector 336 and examples of waveforms of typical signal levels (voltage levels) of the signals A, B and C.

As illustrated in the example in FIG. 7, in the connector pins which are adjacent to the connector pin through which the signal B passes, in the case that the voltage levels of the signals A and C have been simultaneously changed from low levels to high levels, crosstalk noise exceeding the crosstalk noise which would be imposed if only the level of one of the signal A and the signal C is changed is imposed on the signal B (see arrowed parts in FIG. 7). In some cases, the level of the noise which is imposed on the signal B in the above mentioned situation may be doubled as compared with a case in which the level of only one of the signals A and C is changed. In some cases, the crosstalk noise of such a high level as mentioned above may not be negligible for signal processing. In other words, the crosstalk noise may affect the signal processing.

In recent years, the signal transmission rate has increased with the increase in the transmission capacity of a communication apparatus or information processing apparatus. An increase in signal transmission rate may cause sharper rising and falling edges of a signal and hence an increase in crosstalk noise. On the other hand, from the view point of power saving, the signal level, that is, the amplitude of the signal has been more and more reduced. Therefore, it may be further unfavorable to impose excessive crosstalk noise upon a signal which is reduced in amplitude. In addition, as denser packaging of the communication apparatus and the information processing apparatus is promoted, the interval between connector pins is reduced and hence the crosstalk noise may be more and more increased accordingly.

Next, embodiments will be described.

FIG. 1A and FIG. 1B are diagrams illustrating an example of an outline of a signal processing device 10 according to one embodiment. FIG. 1B is a front view illustrating a state in which electronic circuit units and others are coupled to the signal processing device 10.

The signal processing device 10 includes a BWB 12, eight electronic circuit units 16, 18, 20, 22, 24, 26, 28 and 30, a control unit 32, and a cross-connection unit 34. As illustrated in the example in FIG. 1B, the BWB 12 is fixed to a housing 36 and the electronic circuit units 16, 18, 20, 22, 24, 26, 28 and 30, the control unit 32 and the cross-connection unit 34 are coupled to the BWB 12 and are disposed in the housing 36 in the form of shelves. Incidentally, the cross-connection unit 34 is an example of the electronic circuit unit.

Next, the operation of the signal processing device 10 will be briefly explained.

The control unit 32 of the signal processing device 10 sets timings (hereinafter, referred to as signal change timings) at which the levels of signals passing through a connector 46b of the BWB 12 which is coupled to the cross-connection unit 34 are changed in accordance with positions at which wirings are arranged in the connector 46b. That is, the control unit 32 determines timings of signals that main signal devices included in the electronic circuit units 16, 18, 20, 22, 24, 26, 28 and 30 output in accordance with the positions at which the wirings are arranged in the connector 46b.

In the above mentioned example, the signal may be of the type that its voltage level is changed from a low level to a high level or from a high level to a low level. The control unit 32 respectively controls timings at which signals are output from the main signal devices included in the electronic circuit units 16, 18, 20, 22, 24, 26, 28 and 30 based on the signal change timings. Then, in the case that in the wirings concentrated on the connector, there exist a plurality of wirings which are disposed adjacent to a target wiring, the control unit 32 controls the output timings of signals from the respective main signal devices such that the levels of signals passing through the plurality of wirings are not changed simultaneously from high levels to low levels or vice versa. By controlling the signal output timings in the above mentioned manner, it may be possible to reduce the crosstalk noise included in a signal corresponding to the target wiring such as, for example, the signal relating to the cross-connection unit 34.

In the above mentioned embodiment, as illustrated in the example in FIG. 1A, the BWB 12 includes connectors for ten units. Each connector is coupled to each of connectors for the electronic circuit units 16, 18, 20, 22, 24, 26, 28 and 30, the control unit 32, and the cross-connection unit 34. In the example illustrated in FIG. 1A, a connector 38a for the electronic circuit unit 16 is coupled to a connector 38b for the BWB 12, a connector 40a for the electronic circuit unit 18 is coupled to a connector 40b for the BWB 12, and a connector 42a for the electronic circuit unit 20 is coupled to a connector 42b for the BWB 12. Connectors for other electronic circuit units 22, 24, 26, 28 and 30 are coupled to their corresponding connectors for the BWB 12 in the same manner. A connector 44a for the control unit 32 is coupled to a connector 44b for the BWB 12 and a connector 46a for the cross-connection unit 34 is coupled to the connector 46b for the BWB 12.

In the following, the signal processing device 10 will be explained assuming that three electronic circuit units are mounted on the device 10 for the convenience of simplification.

Figure 2:
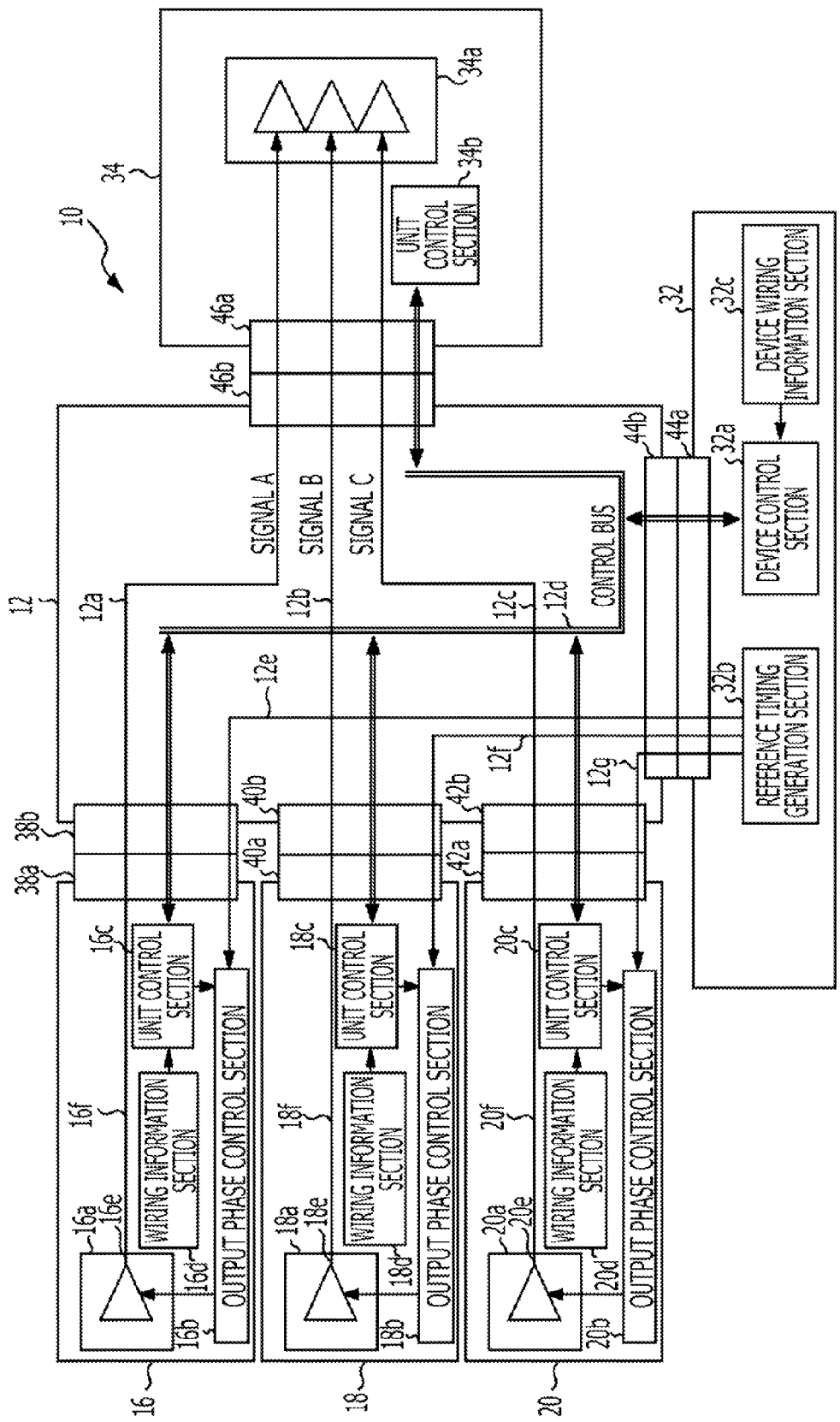
FIG. 2 is a schematic diagram illustrating an example of a simplified configuration of the signal processing device illustrated in FIG. 1A and FIG. 1B.

FIG. 2 is a schematic diagram illustrating an example of a simplified configuration of the signal processing device 10. The signal processing device 10 illustrated in the example in FIG. 2 includes the BWB 12, the electronic circuit units 16, 18 and 20, the control unit 32 and the cross-connection unit 34.

(Configuration of Electronic Circuit Unit)

In the example illustrated in FIG. 2, the electronic circuit unit 16 includes a main signal device 16a for outputting a signal, an output phase control section 16b, a unit control section 16c, a wiring information section 16d and the connector 38a.

The main signal device 16a outputs a signal under the control of the output phase control section 16b.

The output phase control section 16b controls a timing (hereinafter, referred to as a signal output timing) at which a signal is output from the main signal device 16a to make the signal output from the main signal device 16a.

The unit control section 16c controls and manages the general operation of the electronic circuit unit 16 and sends the output phase control section 16b information on the timing at which the signal which is sent from the control unit 32 to the main signal device 16a via the BWB 12 is output from the main signal device 16a.

The wiring information section 16d holds first wiring distance (length) information on a wiring 16f extending from a signal output section 16e of the main signal device 16a to a connector pin of the connector 38a. The first wiring distance information may be read out of the control unit 32 via the BWB 12.

The electronic circuit units 18 and 20 respectively include main signal devices 18a and 20a, output phase control sections 18b and 20b, unit control sections 18c and 20c, wiring information sections 18d and 20d, and the connectors 40a and 42a. The main signal devices 18a and 20a, the output phase control sections 18b and 20b, the unit control sections 18c and 20c, the wiring information sections 18d and 20d and the connectors 40a and 42a are configured and operate in the same manner as the main signal device 16a, the output phase control section 16b, the unit control section 16c, the wiring information section 16d and the connector 38a respectively and hence description thereof will be omitted.

(Configuration of BWB)

In the example illustrated in FIG. 2, the BWB 12 includes wirings 12a, 12b and 12c, a control bus 12d, timing signal lines 12e, 12f and 12g, and the connectors 38b, 40b, 42b, 44b and 46b.

The connectors 38b, 40b and 42b serve as signal input terminals of signals which are sent from the electronic circuit units 16, 18 and 20. The connectors 38b, 40b and 42b are coupled to the connectors 38a, 40a and 42a for the electronic circuit units 16, 18 and 20 respectively. Owing to the above mentioned arrangement, the wirings 12a, 12b and 12c may be respectively coupled to the wiring 16f and wirings 18f and 20f of the electronic circuit units 16, 18 and 20.

In addition, the wirings 12a, 12b and 12c respectively extend from connector pins of the connectors 38b, 40b and 42b and are concentrated on and arranged in the connector 46b.

The connector 44b is coupled to the connector 44a for the control unit 32.

The control bus 12d transmits a control signal supplied from the control unit 32 to each of the electronic circuit units 16, 18 and 20.

The timing signal lines 12e, 12f and 12g are transmission lines through which a reference timing signal is sent to the electronic circuit units 16, 18 and 20 respectively. The timing signal lines 12e, 12f and 12g are installed individually for the electronic circuit units 16, 18 and 20 in order to send the reference timing signal by adjusting respective timings at which the reference timing signal is output, by taking a difference among transmission times taken to send the reference timing signal to the output phase control sections 16b, 18b and 20b of the electronic circuit units 16, 18 and 20 into consideration.

(Configuration of Control Unit)

In the example illustrated in FIG. 2, the control unit 32 includes a device control section 32a, a reference timing generation section 32b, and a device wiring information section 32c.

The device control section 32a controls and manages the general operation of the signal processing device 10. The device control section 32a manages through which positions of connector pins in the connector 46b the signals which have been output from the main signal devices 16a, 18a and 20a are transmitted. The management is realized by using information in which the output signals from the respective main signal devices are indicated in correspondence with the arranged positions of the respective connector pins. The device control section 32a sets each signal change timing (a timing at which the level of each signal output from each main signal device is changed when the signal passes through the connector 46b) at the position of the corresponding connector pin in accordance with the arranged position of the connector pin concerned. As will be described later, the signal change timing is sent to each electronic circuit unit in the form of information (phase difference information) on a phase shift of the signal concerned from the reference timing signal and the signal to be output from each electronic circuit unit is controlled in accordance with the signal change timing. In other words, the device control section 32 controls the phase of each output signal from each main signal device which is transmitted through each connector pin arranged in accordance with the arranged position of the connector pin concerned.

In addition, the device control section 32a reads out the first wiring distance information and the second wiring distance information held in the device wiring information section 32c and obtains transmission times taken to transmit signals output from the signal output sections 16e, 18e and 20e of the main signal devices 16a, 18a and 20a to the connector 46b on the basis of the first and second wiring distance information. Then, the device control section 32a determines and adjusts the phase difference information by using the transmit times so obtained such that the signal change timings of signals passing through the connector 46b may become appropriate to determine timings at which the signals are output from the main signal devices 16a, 18a and 20a. The device control section 32a sends information on each of the signal output timings to each of the unit control sections 16c, 18c and 20c of the electronic circuit units 16, 18 and 20.

In the example illustrated in the drawing, the first wiring distance information is information indicating the distance (the length) of each wiring extending from the signal output section of each of the main signal devices 16a, 18a and 20a of the electronic circuit units 16, 18 and 20 to each of the connector pins serving as signal output terminals of the connectors 38a, 40a and 42a. In general, the information is different for different electronic circuit unit.

The second wiring distance information is information indicating the distance (the length) of each wiring extending from the connector pin of each of the connectors 38b, 40b and 42b serving as signal input terminals on the side of the BWB 12 to the connector 46b for the BWB which serves as a wiring concentrating section, such as, for example, to a part of the connector 46b on which the wirings are concentrated or to each corresponding connector pin.

Incidentally, the first wiring distance information is held in each of the wiring information sections 16d, 18d and 20d of the respective electronic circuit units 16, 18 and 20. Then, the information held in each wiring information section is transferred to the device control section 32a via each of the unit control sections 16c, 18c and 20c and the control bus.

In the above mentioned manner, the device control section 32a acquires the first wiring distance information on the wirings 16f, 18f and 20f of the electronic circuit units 16, 18 and 20 which are respectively coupled to the wirings 12a, 12b and 12c.

The signal change timings and the signal output timings that the device control section 32a determines will be described later.

The reference timing generation section 32b generates the reference timing signal and sends it to the output phase control sections 16b, 18b and 20b respectively via the timing signal lines 12e, 12f and 12g. The reference timing signal is a signal on the basis of which each of the output phase control sections 16b, 18b and 20b controls the signal output timing.

The device wiring information section 32c holds the first wiring distance information and the second wiring distance information. The first wiring distance information is information which has been transferred from each of the wiring information sections 16d, 18d and 20d to the device control section 32a via each of the unit control sections 16c, 18c and 20c and the control bus and recorded into the device wiring information section 32c when each of the electronic circuit units 16, 18 and 20 has been coupled to the BWB 12. The second wiring distance information is recorded in advance in the device wiring information section 32c.

In addition, the device wiring information section 32c holds connector pin correspondence information which indicates the positions of the connector pins of the connectors 38b, 40b and 42b and the arranged positions of the wirings in the connector 46b in one-to-one correspondence.

(Configuration of Cross-Connection Unit)

In the example illustrated in FIG. 2, the cross-connection device 34 includes a cross-connection device 34a, a unit control section 34b and the connector 46a.

The cross-connection device 34a performs cross-connection processing for freely switching and outputting a signal sent from each of the electronic circuit units 16, 18 and 20 to another electronic circuit unit.

The unit control section 34b controls and manages the cross-connection processing performed using the cross-connection device 34a.

(Flows for Setting Signal Change Timings (Phases of Signals) at Wiring Concentrated Positions and for Setting Timings that Electronic Circuit Units Output Signals)

The control unit 32 determines the signal change timings of respective signals at their corresponding positions in the connector 46b in the following manner and timings at which signals are output from the main signal devices 16a, 18a and 20a are set on the basis of the determined signal change timings.

Figure 3B:
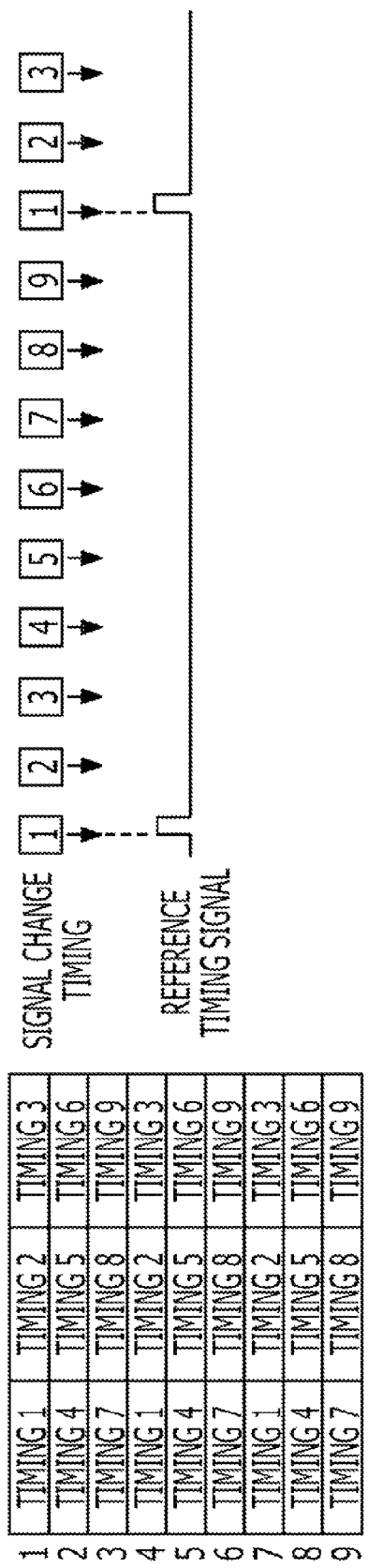
FIG. 3B is a diagram illustrating another example of signal change timings.

FIG. 3A and FIG. 3B are diagrams illustrating examples of signal change timings.

First, the device control section 32a acquires information on the electronic circuit units 16, 18 and 20 which are coupled to the connectors 38b, 40b and 42b.

Then, the device control section 32a specifies positions through which the respective signals pass in the connector 46b, that is, the positions (the arranged positions) of the connector pins for the wirings 12a, 12b and 12c in the connector 46b. In the above mentioned situation, it is assumed that information indicating to which connector pins in the connectors 38b, 40b and 42b the wirings 12a, 12b and 12c are coupled is set in advance in the device control section 32a. Owing to the above mentioned arrangement, the device control section 32a is allowed to specify through which connector pin positions in the connector 46b the signals which are output from the electronic circuit units 16, 18 and 20 pass by using the connector pin correspondence information.

In this connection, correspondence of the signals output from the respective electronic circuit units with the connector pins in the connector 46b on which the signals are concentrated will be assumed as follows.

That is, as illustrated in the example in FIG. 2, it is assumed that a signal A, a signal B and a signal C are output from the electronic circuit units 16, 18 and 20 respectively. Then, it is also assumed that the signal A is transmitted through the wiring 12a illustrated in the example in FIG. 2 and passes through a connector pin of a pin No. #1 in the connector 46b as illustrated in the example in FIG. 3A. Likewise, it is assumed that the signal B is transmitted through the wiring 12b illustrated in the example in FIG. 2 and passes through a connector pin of a pin No. #2 in the connector 46b as illustrated in the example in FIG. 3A. It is also assumed that the signal C is transmitted through the wiring 12c illustrated in the example in FIG. 2 and passes through a connector pin of a pin No. #3 in the connector 46b as illustrated in the example in FIG. 3A.

In the above mentioned case, the signal B which is transmitted through the pin #2 is adjacent to the pins #1 and #3 in the connector 46b and hence the signal B may be influenced by crosstalk from the signals A and C which are transmitted through the pins #1 and #3. However, as will be described later, such a situation may be avoided in which the signal B is influenced by the crosstalk simultaneously from the signals A and C by controlling the output timings of the signals such that the signal change timings are different from each other at the pins #1 and #3.

Specifically, the wirings 12a and 12c are adjacent to the wiring 12b which is coupled to the pin #2, so that the device control section 32a sets such that the signal change timings of the signals A and C that pass through the wirings 12a and 12c are different from each other.

In addition, the device control section 32a also sets such that the signal change timing of the signal B that passes through the wiring 12b is different from both of the signal change timings of the signals A and C. In the above mentioned case, each of the signal change timings to be set may be one of a plurality of timings which are periodically repeated such as timings 1, 2 and 3 as illustrated in the example in FIG. 3A. That is, the timing 1 may be set as a timing at which the reference timing signal which is a periodically generated signal rises, the timing 2 may be set as a timing at which the reference timing signal falls, and the timing 3 may be set as a timing which is obtained when a fixed time has elapsed after falling of the reference timing signal. As illustrated in the example in FIG. 3A, the crosstalk noise derived from the signals A and C is imposed on the signal B. However, the signals A and C do not change at the same timing in the connector 46b. That is, the crosstalk noise derived from the signals A and C are not simultaneously imposed on the signal B.

In the example illustrated in FIG. 3A, signals A to F respectively pass through pins #1 to #6 which are linearly arranged in the connector 46b. The device control section 32a of the signal processing device 10 sets the signal change timings of the signals A to F so as to be repeated in order of the timings 2, 1 and 3. By setting the signal change timings in the above mentioned manner, it may become possible to avoid such a situation that the level of a signal corresponding to one target connector pin is changed simultaneously with change of the levels of signals corresponding to connector pins which are adjacent to the target pin.

In other words, the device control section 32a of the signal processing device 10 sets a phase shift (signal change point) of each signal from the reference timing signal such that one target signal and signals which are adjacent to the target signal are out of phase with one another (do not match one another in signal change point) in a part on which the signals are concentrated.

Then, the output phase control sections 16b, 18b and 20b control the signal output timings at which the signals A, B and C are output from the main signal devices 16a, 18b and 20a such that the signal levels of the signals A, B and C are changed in the connector 46b at the set signal change timings respectively.

The device control section 32a sets the above mentioned signal output timings by taking the transmission times taken to transmit the signals from the signal output sections 16e, 18e and 20e of the main signal devices 16a, 18a and 20a to the connector 46b into consideration.

The above mentioned transmission times are times taken to transmit the signals output from the electronic circuit units 16, 18 and 20 to the connector 46b through the BWB 12.

Specifically, as illustrated in the example in FIG. 3A, it is assumed that the timing 1 is a timing at which the reference timing signal rises, the timing 2 is a timing at which the reference timing signal falls when 5 nsec has elapsed after rising of the reference timing signal, and the timing 3 is a timing obtained when 10 nsec has elapsed after rising of the reference timing signal. Further, it is assumed that the signal change timing of the signal A is set to the timing 2, the signal change timing of the signal B is set to the timing 1 and the signal change timing of the signal C is set to the timing 3. In the above mentioned case, the phase difference information indicating a difference in the phase of each signal from the reference timing signal which is used to set the signal change timings of the signals A, B and C in the connector 46b is set to 5 nsec for the signal A, 0 nsec (or 15 nsec) for the signal B and 10 nsec for the signal C. In the above mentioned situation, it is assumed that the transmission time of the signal A is 3 nsec, the transmission time of the signal B is 2 nsec and the transmission time of the signal C is 5 nsec.

The device control section 32a performs the following calculations in order to set the signal output timings.

For the signal A, the signal change timing of which is the timing 2, the device control section 32a subtracts the transmission time 3 nsec of the signal A from a delayed time 5 nsec of the timing 2 from the time at which the reference timing signal rises to obtain a delayed time 2 nsec (=5 nsec−3 nsec) from the time at which the reference timing signal rises.

On the other hand, for the signal B, although the signal change timing of the signal B is the timing 1 at which the reference timing signal rises, a one-cycle preceding reference timing signal is used, taking the transmission time of the signal B into consideration. Thus, the device control section 32a subtracts the transmission time 2 nsec of the signal B from a delayed time 15 nsec from the time at which the one-cycle preceding reference timing signal rises to obtain a delayed time 13 nsec (=15 nsec−2 nsec) from the time at which the reference timing signal rises.

For the signal C, the signal change timing of which is the timing 3, the device control section 32a obtains a delayed time 5 nsec (=10 nsec (a delayed time of the timing 3 from the time at which the reference timing signal rises)−5 nsec (the transmission time) of the signal C from the time at which the reference timing signal rises as in the case for the signal A.

In the above mentioned manner, the phase difference information which is set to 5 nsec for the signal A, to 0 nsec (or 15 nsec) for the signal B and to 10 nsec for the signal C is adjusted to 2 nsec later, to 13 nsec later and then to 5 nsec in order in accordance with the transmission times of the signals through the BWB 12. In the above mentioned manner, the signal output timings are set on the basis of the reference timing signal.

In determining the signal output timings, the device control section 32a reads out the first wiring distance information and the second wiring distance information held in the device wiring information section 32c, then obtains transmission distances over which the signals A, B and C are respectively transmitted from their corresponding signal output sections to the connector 46b and divides each of the transmission distances so obtained by each of already obtained transmission speeds of the signals A, B and C to obtain each of the transmission times of the respective signals A, B and C.

The device control section 32a transfers the above mentioned pieces of phase difference information respectively to the unit control sections 16c, 18c and 20c as pieces of information on the signal output timings of the signals A, B and C.

Incidentally, even in the case that four or more wirings are prepared, signal change timings of the respective signals may be classified into three groups of the timings 1, 2 and 3 and a signal passing through a target wiring and signals passing through adjacent wirings which are adjacent to the target wiring may be classified into different groups in the same manner as the above.

In the case that the pins of the connector are arranged one-dimensionally as illustrated in the example in FIG. 3A, when a certain connector pin is regarded as a target connector pin, connector pins through which signals the crosstalk noise from which may be readily imposed on the signal passing through the target connection pin pass are two connector pins which are physically adjacent to the target connector pin. Thus, even in the case that four or more wirings are prepared, the crosstalk noise may be reduced by classifying the above mentioned two connector pins which are adjacent to the target connector pin and the target connector pin which is sandwiched between the above mentioned two connector pins into three different groups of signal change timings.

The device control section 32a transfers each piece of phase difference information adjusted as described above. That is, each piece of information on each of the signal output timings of the signals A, B and C obtained in the above mentioned manner are transferred to each of the unit control sections 16c, 18c and 20c via the control bus 12d.

In the example illustrated in FIG. 3A, the device control section 32a transfers the phase difference information of the signal A to the unit control section 16c via the control bus 12d such that the signal A is output from the signal output section 16e at a signal change time which comes 2 nsec later after rising of the reference timing signal. The same thing also applies to the signal output timings of the signals B and C.

The unit control sections 16c, 18c and 20c send the supplied pieces of phase difference information to the output phase control sections 16b, 18b and 20b. The output phase control sections 16b, 18b and 20b control the output timings of the signals A, B and C using the above mentioned pieces of phase difference information on the basis of the reference timing signal generated using the reference timing generation section 32b and supplied thereto via the timing signal lines 12e, 12f and 12g of the BWB 12. Incidentally, the timing signal lines 12e, 12f and 12g are installed for the respective electronic circuit units and output of each reference timing signal is adjusted such that the generated reference timing signals may not deviate from one another.

In the above mentioned embodiment, the connector 46b has a configuration in which the connector pins are linearly arranged as illustrated in the example in FIG. 3A. In addition to the above mentioned configuration, in some cases, the connector 46b may have a configuration in which the connector pins are arranged two-dimensionally as illustrated in the example in FIG. 3B. That is, the wirings may be arranged either linearly or two-dimensionally.

In the case that the connector pins are arranged in the form of three columns in a horizontal directions and nine pins in a vertical direction as illustrated in the example in FIG. 3B, signals passing through eight adjacent connector pins surrounding one connector pin are set at mutually different signal change timings in the connector 43b.

In the above mentioned case, the device control section 32a may prepare nine different signal change timings. Then, the device control section 32a determines the signal change timings such that one of the nine timings is allocated to a signal corresponding to a target connector pin and the remaining eight signal change timings are allocated to the signals corresponding to the eight adjacent connector pins.

Even when the connector pins are arranged as illustrated in the example in FIG. 3B, the crosstalk noise may be reduced by allocating the nine signal change timings to the adjacent eight connector pins and the target connector pin surrounded by these eight connector pins in the above mentioned manner.

As described above, the device control section 32a of the signal processing device 10 controls such that the signal change timings of the signal passing through the target wiring and the signals passing through the adjacent wirings which are adjacent to the target wiring are different from one another. As a result, simultaneous change of signal levels of the signals passing through the target wiring and the wirings which are adjacent to the target wiring may be avoided. That is, the crosstalk noise which would be imposed on the signal passing through the target wiring (or the connector pin) in wirings which are concentrated on the connector 46*b* may be reduced.

As a result, example embodiments do not require the use of a material of a quality which is costly because of the materials crosstalk noise characteristics. In addition, in the case that the BWB 12 is made of the material which is the same as that of a conventional BWB, it may become possible to use a signal which is smaller in amplitude than used in conventional devices and hence power saving of the signal processing device 10 according to example embodiments may be realized.

In addition, the crosstalk noise may be more reduced using example embodiment such as those described above so that it may become also possible to use a high-frequency signal which is reduced in amplitude and increased in transmission speed.

In addition, each of the output phase control sections 16*b*, 18*b* and 20*b* controls the signal output timing on the basis of the reference timing signal supplied from the control unit and hence may control each signal which has been output from the electronic circuit unit such that each signal may have an appropriate signal change timing when the signal has reached the connector 46*b* on which signals are concentrated.

In addition, the signal change timing is set by taking the transmission time taken to transmit each signal in the BWB 12 into consideration. That is, the timing, at which the level of the signal concerned which reaches the connector 46*b* passing through the BWB 12 is changed, may be set with precision.

FIG. 4 is a schematic diagram illustrating an example of a simplified configuration of a signal processing device 100 according to another embodiment. In the signal processing device 10 illustrated in FIG. 2, the device control section 32*a* in the device unit 32 sets the phase difference information on the signal change timing relative to the reference timing signal. On the other hand, in the signal processing device 100 according to this embodiment, each of unit control sections of the electronic circuit units sets the phase difference information on each signal change timing relative to the reference timing signal and adjusts the phase difference information so set by taking the transmission time of each signal through a BWB 102 into consideration.

The signal processing device 100 includes the BWB 102, electronic circuit units 106, 108 and 110, a control unit 122 and a cross-connection unit 124.

The BWB 102 includes wirings 102*a*, 102*b* and 102*c*, a control bus 102*d*, timing signal lines 102*e*, 102*f* and 102*g*, connectors 128*b*, 130*b*, 132*b*, 134*b* and 136*b*. The wirings 102*a*, 102*b* and 102*c*, the control bus 102*d*, the timing signal lines 102*e*, 102*f* and 102*g* and the connectors 128*b*, 130*b*, 132*b*, 134*b* and 136*b* are configured and operate in the same manner as the wirings 12*a*, 12*b* and 12*c*, the control bus 12*d*, the timing signal lines 12*e*, 12*f* and 12*g*, and the connectors 38*b*, 40*b*, 42*b*, 44*b* and 46*b* and hence description thereof will be omitted.

The electronic circuit units 106, 108 and 110 respectively include main signal devices 106*a*, 108*a* and 110*a*, output phase control sections 106*b*, 108*b* and 110*b*, unit control sections 106*c*, 108*c* and 110*c*, wiring information sections 106*d*, 108*d* and 110*d*, wirings 106*f*, 108*f* and 110*f*, and connectors 128*a*, 130*a* and 132*a*.

The main signal devices 106*a*, 108*a* and 110*a*, the output phase control sections 106*b*, 108*b* and 110*b*, the wirings 106*f*, 108*f* and 110*f* and the connectors 128*a*, 130*a* and 132*a* are configured and operate in the same manner as their corresponding components illustrated in the example in FIG. 2 and hence description thereof will be omitted.

The wiring information sections 106*d*, 108*d* and 110*d* record and hold first wiring distance information and second wiring distance information. The first wiring distance information and the second wiring distance information are the same as the first wiring distance information and the second wiring distance information in the embodiment which has been described with reference to FIG. 2.

The wiring information sections 106*d*, 108*d* and 110*d* also hold connector pin correspondence information. The connector pin correspondence information is the same as the connector pin correspondence information illustrated in FIG. 3A and FIG. 3B.

The first wiring distance information, the second wiring distance information and the connector pin correspondence information are recorded and held in advance in the wiring information sections 106*d*, 108*d* and 110*d*.

The unit control sections 106*c*, 108*c* and 110*c* set signal change timings at which the signal levels of signals in the connector 136*b* which is coupled to the cross-connection unit 124 are changed and signal output timings at which the main signal devices 106*a*, 108*a* and 110*a* output signals. The unit control sections 106*c*, 108*c* and 110*c* respectively send the output phase difference control sections 106*b*, 108*b* and 110*b* the signal output timings so set.

The unit control sections 106*c*, 108*c* and 110*c* specify to which connectors in the BWB 102 the connectors 128*a*, 130*a* and 132*a* of the electronic circuit units 106, 108 and 110 are coupled by acquiring packaged position information that the unit control sections 106*c*, 108*c* and 110*c* receive from the BWB 102 respectively via the connectors 128*a*, 130*a* and 132*a*. The packaged position information is used to specify through which positions of connector pins in the connector 136*c* the signals which have been output from the electronic circuit units 106, 108 and 110 are transmitted and to manage the connector pin positions so specified. In other words, the packaged position information is used in the unit control sections 106*c*, 108*c* and 110*c* in order to specify and manage the positions of connector pins through which the signals concerned are transmitted using information in which output signals from the main signal devices are indicated in correspondence with the arranged positions of connector pins.

The control unit 122 includes a device control section 122*a*, a reference timing generation section 122*b*, and a connector 134*a*. The reference timing generation section 122*b* and the connector 134*a* are configured and operate in the same manner as the reference timing generation section 32*b* and the connector 44*a* according to the embodiment which has been described with reference to FIG. 2 and hence description thereof will be omitted.

The device control section 122*a* controls and manages the general operation of the signal processing device 100. Unlike the corresponding device control section according to the embodiment which has been described with reference to FIG. 2, the unit control sections 106*c*, 108*c* and 110*c* set the signal change timings and the signal output timings of the signals and hence the device control section 122*a* does not perform processing for setting the above mentioned timings.

The cross-connection unit 124 includes a cross-connection device 124*a*, a unit control section 124*b*, and a connector 136*a*. The cross-connection device 124*a*, the unit control section 124*b*, and the connector 136*a* are configured and operate in the same manner as the cross-connection device 34*a*, the unit control section 34*b* and the connector 46*a* illustrated in FIG. 2 and hence description thereof will be omitted.

(Flows of Setting Signal Change Timings and Signal Output Timings)

When the electronic circuit units 106, 108 and 110 have been coupled to the connectors of the BWB 102, the unit control sections 106c, 108c and 110c accept packaged position information from the respective connectors. The packaged position information is information which is obtained from, for example, a pattern indicative of whether the plurality of connector pins of each connector are energized. The packaged position information is information inherent to each connector. Thus, the unit control sections 106c, 108c and 110c are allowed to specify to which connectors in the BWB 102 the electronic circuit units 106, 108 and 110 have been coupled.

In addition, each of the unit control sections 106c, 108c and 110c reads out the connector pin correspondence information which is prepared per connector of the BWB 102 and is held in each of the wiring information sections 106d, 108d and 110d. Each of the unit control sections 106c, 108c and 110c specifies at which connector pin a wiring through which a signal concerned is transmitted is positioned in the connector 136b using the connector pin correspondence information and the acquired packaged position information.

Each of the unit control sections 106c, 108c and 110c sets phase difference information indicative of a phase shift (difference) of each signal from the reference timing signal on the basis of the position of a connector pin concerned in the connector 136b or the arranged position of a wiring concerned in order to set the signal change timing of the signal concerned. The signal change timing is determined on the basis of basic timing signals such as the timings 1, 2 and 3.

In the case that there exist the plurality of connector pins which are adjacent to the target connector pin as illustrated in the example in FIG. 3A or FIG. 3B, the above mentioned phase difference information is set such that the signal change timings of signals passing through the connector pins which are adjacent to the target connector pin are different from one another. In addition, the phase difference information is also set such that the signal change timings of signals passing through the target connector pin and the connector pins which are adjacent to the target connector pin are different from one another. In other words, in the case that there exist a plurality of adjacent wirings which are adjacent to a target wiring, the phase difference information is set such that the signal change timings of signals passing through the adjacent wirings are different from each other. In addition, the phase difference information is also set such that the signal change timings of signals passing through the target wiring and the adjacent wirings are different from one another.

Next, each of the unit control sections 106c, 108c and 110c adds the second wiring distance information to the first wiring distance information and divides a result of addition by an already obtained signal transmission speed to obtain a transmission time taken to transmit a signal concerned from each of the signal output sections of the main signal devices 106a, 108a and 110a to the connector 136b.

In addition, each of the unit control sections 106c, 108c and 110c subtracts the obtained transmission time from the set phase difference information to adjust the phase difference information and sets the adjusted phase difference information as information indicative of the signal output timing. Adjustment of the phase difference information is performed in the same manner as that in the embodiment which has been described with reference to FIG. 2. The set information indicative of the signal output timing is sent to each of the output phase control sections 106b, 108b and 110b.

The output phase control sections 106b, 108b and 110b control timings at which the signals are output on the basis of the reference timing signal supplied from the BWB 102 using the above mentioned phase difference information. Owing to the above mentioned controlling operation, the main signal devices 106a, 108a and 110a are allowed to output the signals at the signal output timings which are set on the basis of the reference timing signal.

The signal change timings which are set using the unit control sections 106c, 108c and 110c are selected from within a plurality of timings which are prepared to be commonly used by the unit control sections 106c, 108c and 110c. In addition, the signal change timings are set using the unit control sections 106c, 108c and 110c on the basis of an algorithm which is prepared to be commonly used by the unit control sections 106c, 108c and 110c. Thus, the signal change timings which have been separately set using the electronic circuit units 106, 108 and 110 are uniquely set as in the case in the embodiment which has been described with reference to FIG. 2.

As described above, in the case that there exist the plurality of adjacent wirings around the target wiring, the unit control sections 106c, 108c and 110c of the signal processing device 100 control such that the signal change timings of the signals passing through the target wiring and the adjacent wirings are different from one another. As a result, simultaneous change of the signal levels of the signals passing through the target wiring and the adjacent wirings may be avoided. That is, the crosstalk noise which would be imposed on the signal passing through the target wiring (or the target connector pin) in the wirings which are concentrated on the connector may be reduced.

As a result, example embodiments do not require use a material of a quality which is costly due to crosstalk noise characteristics as the material of the BWB 102. In addition, in the case that the BWB 102 is made of the material which is the same as that of a conventional BWB, it may become possible to use a signal which is smaller in amplitude and hence power saving of the signal processing device 100 may be realized according to example embodiments.

In addition, the crosstalk noise may be more reduced using example embodiments as described above so that it may become also possible to use a high-frequency signal which is reduced in amplitude and increased in transmission speed.

The control unit 122 may only have the reference timing generation section 122b and hence the configuration thereof may be more simplified than that in the embodiment which has been described with reference to FIG. 2.

In addition, each of the output phase control sections 106b, 108b and 110b controls the signal output timing on the basis of the reference timing signal supplied from the control unit 122 and hence may control such that each signal which has been output from the electronic circuit unit may have an appropriate signal change timing when the signal has reached the connector 136b on which the signals are concentrated.

In addition, each signal change timing is set by taking the transmit time taken to transmit each signal through the BWB 102 into consideration. That is, the timing at which the level of the signal concerned which reaches the connector 136b passing through the BWB 102 is changed may be set with precision.

Figure 5:
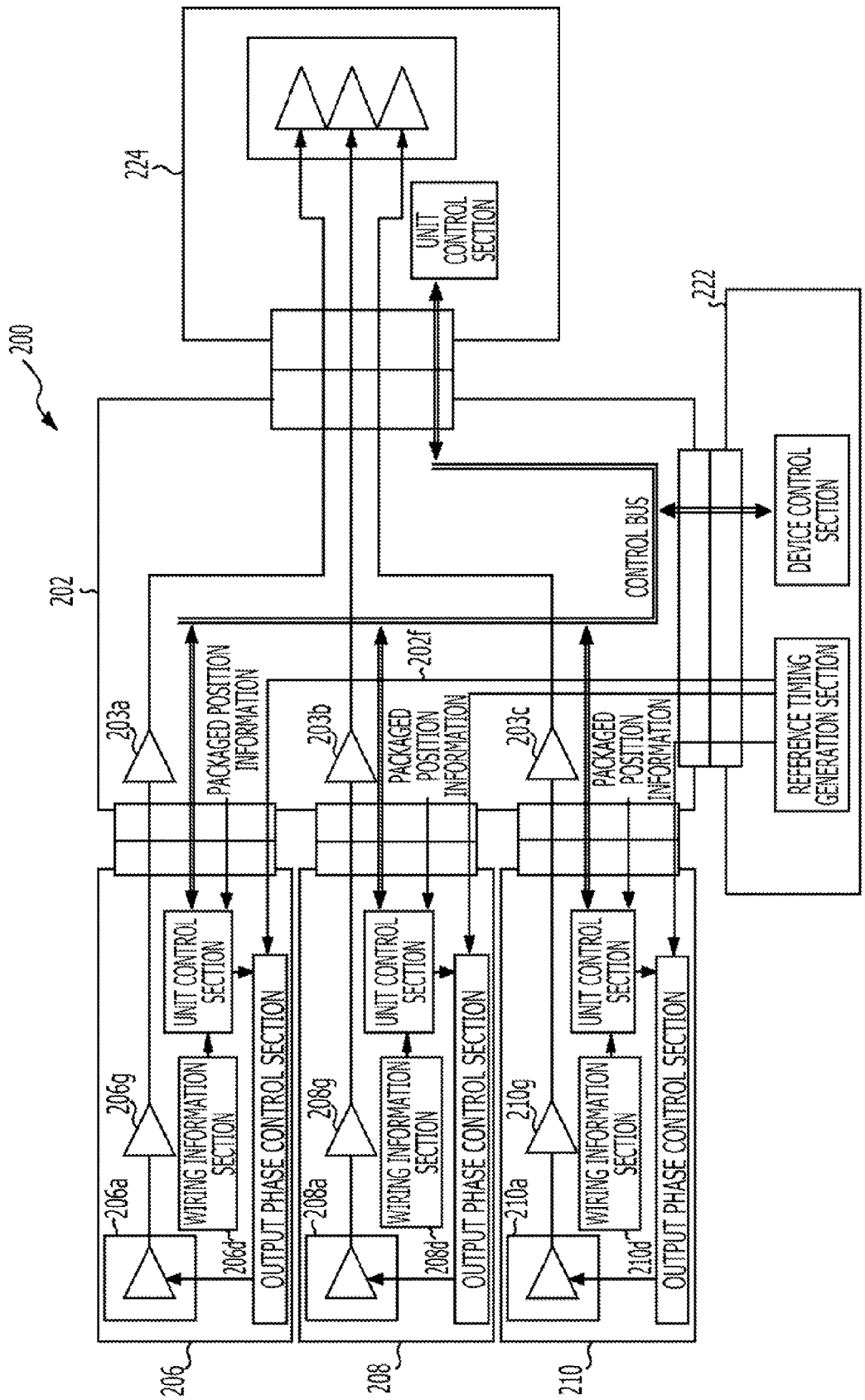
FIG. 5 is a schematic diagram illustrating an example of a simplified configuration of a signal processing device according to a further embodiment.

FIG. 5 is a schematic diagram illustrating an example of a simplified configuration of a signal processing device 200 according to a further embodiment. In the signal processing device 200 according to this embodiment, each of the unit control sections in the electronic circuit units does not adjust phase difference information which is used to set the signal change timing of the signal concerned by taking the transmission time of the signal into consideration and uses the phase difference information directly for setting the signal output timing.

The signal processing device 200 includes a BWB 202, electronic circuit units 206, 208 and 210, a control unit 222 and a cross-connection unit 224.

The control unit 222 and the cross-connection unit 224 are configured and operate in the same manner as the control unit 122 and the cross-connection unit 124 of the signal processing device 100 according to the embodiment which has been described with reference to FIG. 4 and hence description thereof will be omitted.

The BWB 202 includes wirings, timing signal lines, a control bus and connectors which are configured and operate in the same manner as the wirings 102a, 102b, 102c, the timing signal lines 102e, 102 and 102g, the control bus 102d, and the connectors 128b, 130b, 132b, 134b and 136b of the signal processing device 100 according to the embodiment which has been described with reference to FIG. 4 and hence description thereof will be omitted.

The BWB 202 also includes delay elements 203a, 203b and 203c which are disposed on respective wirings. The delay elements 203a, 203b and 203c are delay elements for delaying signals passing through the respective wirings.

The BWB 202 is configured to set the transmission times taken to transmit signals concerned from the connectors 128b, 130b and 132b of the BWB 202 which are coupled to the electronic circuit units 206, 208 and 210 to the connector 136b which is coupled to the cross-connection unit 224 constant regardless of the length of each wiring by adjusting the delay elements.

The electronic circuit units 206, 208 and 210 include main signal devices 206a, 208a and 210a, output phase control sections, unit control sections, wiring information sections 206d, 208d and 210d, wirings and connectors. The main signal devices 206a, 208a and 210a, the output phase control sections, the unit control sections, the wirings and the connectors are configured and operate in the same manner as the main signal devices 106a, 108a, 110a, the output phase control sections 106b, 108b and 110b, the unit control sections 106c, 108c and 110c, the wirings 106f, 108f and 10f, and the connectors 128a, 130a and 132a of the signal processing device 100 according to the embodiment which has been described with reference to FIG. 4 and hence description thereof will be omitted.

The electronic circuit units 206, 208 and 210 also include delay elements 206g, 208g and 210g which are disposed on respective wirings. The delay elements 206g, 208g and 210g have functions to delay signals passing through the wirings of the electronic circuit units 206, 208 and 210. The respective delay elements are set such that transmission times taken to transmit signals from signal output sections of the main signal devices 206a, 208a and 210a of the electronic circuit units 206, 208 and 210 to the connector which is coupled to the BWB 202 are adjusted to be constant regardless of a difference in wiring length among the electronic circuit units 206, 208 and 210.

The wiring information sections 206d, 208d and 210d of the electronic circuit units 206, 208 and 210 hold the connector pin correspondence information which has been described in the explanation of the embodiment illustrated in FIG. 4 and do not hold the first wiring distance information and the second wiring distance information which have been described in the explanation of the embodiment illustrated in FIG. 4. The reason for the above is as follows. That is, the transmission times taken to transmit the signals output from the respective electronic circuit units to the connector at the other end of the BWB on which the wirings are concentrated are adjusted to be the same as one another by using the delay elements 203a, 203b and 203c in the BWB and the delay elements 206g, 208g and 210g in the respective electronic circuit units. Thus, once the above mentioned phase difference information indicative of a phase shift (difference) of a signal concerned from the reference timing signal on the basis of which each signal change timing is determined is settled, it is allowed not to consider the transmission time of each signal which is obtained on the basis of the first wiring distance information and the second wiring distance information.

In the signal processing device 200, the unit control sections of the electronic circuit units 206, 208 and 210 set the signal change timings using the phase difference information indicative of the phase shift (difference) of the signal concerned from the reference timing signal and send the signal change timings so set to the respective output phase control sections as the signal output timings in the same manner as that in the embodiment which has been described with reference to FIG. 4. The respective output phase control sections control the timings at which the signals are output, using the signal output timings so sent and using the above mentioned phase difference information which is obtained on the basis of the reference timing signal and is sent from the BWB 202.

The transmission times of the signals which are output from the main signal devices 206a, 208a and 210a of the electronic circuit units 206, 208 and 210 are adjusted to be constant, so that all the signals which reach respective connectors coupled to the cross-connection unit 224 are delayed by the transmission time. However, all the signals output from the electronic circuit units 206, 208 and 210 are delayed by the same transmission time and hence in the case that there exist a plurality of adjacent wirings which are adjacent to a target wiring in the wirings which are concentrated on the connector, simultaneous change of the signal levels of the signals passing through these adjacent wirings may be avoided.

The signal change timings that the unit control sections of the electronic circuit units 206, 208 and 210 set are periodically repeated timings and hence each of the transmission times adjusted using the delay elements 203a, 203b and 203c or each of the transmission times adjusted using the delay elements 206g, 208g and 210g may be delayed by the time which is integer times as long as the cycle in which the signal change timings are repeated.

As described above, in the case that there exist a plurality of adjacent wirings around a target wiring, the unit control section of the signal processing device 200 controls such that the signal change timings of signals passing through the target wiring and the above mentioned adjacent wirings are different from one another. By controlling the signal change timings in the above mentioned manner, simultaneous change of the signals passing through the target wiring and the above mentioned adjacent wirings may be avoided. That is, the crosstalk noise which would be imposed on the signal passing through the target wiring (or the target connector pin) in the wirings which are concentrated on the connector may be reduced.

As a result, according to example embodiment, a material that is costly because of it crosstalk noise characteristics is not required for the BWB 202. In addition, in the case that the BWB 202 is made of the material which is the same as that of a conventional BWB, it may become possible to use a signal which is smaller in amplitude and hence power saving of the signal processing device 200 according to example embodiments may be realized.

In addition, the crosstalk noise may be more reduced according to example embodiments so that it may become also possible to use a high-frequency signal which is reduced in amplitude and increased in transmission speed.

The control unit 222 may only need to have the reference timing generation section and hence the signal processing device 200 may be realized by a simple configuration.

In addition, the output phase control section controls the signal output timing on the basis of the reference timing signal supplied from the control unit and hence may control such that each signal which has been output from the electronic circuit unit may have an appropriate signal change timing at a point of time that the signal has reached the connector on which signals are concentrated.

The signal processing device 200 is allowed to specify the arranged positions of the wirings in the connector on which the signals from the electronic circuit units are concentrated using the packaged position information and the connector pin correspondence information and hence it may become possible to appropriately determine the signal change timings.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A signal processing device comprising:
    a wiring unit including a plurality of signal input terminals, wirings extending from the signal input terminals, and a wiring concentration section on which the wirings are concentrated;
    a plurality of electronic circuit units, each including a device that outputs a signal, an output control section that controls a timing at which the device outputs the signal, and a signal output terminal coupled to the signal input terminal; and
    a control unit that supplies a reference timing signal to the plurality of electronic circuit units, wherein
    each of the output control section controls a timing at which the signal is output based on the reference timing signal and phase difference information indicative of a phase difference between the signal and the reference timing signal.

2. The signal processing device according to claim 1, wherein
    the control unit outputs the phase difference information to the electronic circuit unit.

3. The signal processing device according to claim 1, wherein
    each of the electronic circuit units further includes a unit control section through which the signal output device supplies the phase difference information to the output control section.

4. The signal processing device according to claim 1, wherein
    the phase difference information is selected from within a plurality of timings which are periodically repeated and in a case that there exist adjacent wirings which are adjacent to one wiring in the wiring concentration section, pieces of phase difference information of the adjacent wirings are selected to be different from one another.

5. The signal processing device according to claim 1, wherein
    each of the plurality of electronic circuit units specifies arranged positions of the respective wirings to which the signal output terminals are coupled in the wiring concentration section, using information for specifying the position of each of the signal input terminals which are coupled to the signal output terminals and correspondence information indicating the positions of the signal input terminals in the wiring unit and the wiring arranged positions in the wiring concentration section in one-to-one correspondence.

6. The signal processing device according to claim 1, wherein
    the control unit further includes
    a device wiring information section that holds first wiring distance information indicating the distance of a wiring from the signal output section of the signal output device to the signal output terminal and second wiring distance information indicating the distance of a wiring from each of the signal input terminals of the wiring unit to the wiring concentration section, and
    a device control section that obtains a transmission time taken to transmit the signal from a signal output position of the signal output device to the wiring concentration section based on the first wiring distance information and the second wiring distance information, adjusts the phase difference information using the obtained signal transmission time, and sends each of the output control sections of the electronic circuit unit the adjusted phase difference information.

7. The signal processing device according to claim 1, wherein
    each of the electronic circuit units further includes a wiring information section that records the first wiring distance information, and
    the first wiring distance information is information which has been read out of the wiring information section, acquired using the device control section and recorded in the wiring information section of the device.

8. The signal processing device according to claim 3, wherein
    the unit control section further includes
    a wiring information section that holds first wiring distance information indicating the distance of a wiring from the signal output section of the signal output device to the signal output terminal and second wiring distance information indicating the distance of a wiring from each of the signal input terminals of the wiring unit to the wiring concentration section, and
    the unit control section obtains a transmission time taken to transmit the signal from the signal output section of the signal output device to the wiring concentration section based on the first wiring distance information and the second wiring distance information and determines the phase difference information using the obtained transmission time.

9. The signal processing device according to claim 3, wherein
    each of the wirings includes a delay element.

* * * * *